United States Patent
Park et al.

(10) Patent No.: US 11,588,362 B2
(45) Date of Patent: Feb. 21, 2023

(54) ROTOR DRIVE APPLIED TO DRIVE MOTOR WITH A STRUCTURE IN WHICH REMOVES A FIXATION JAWS FOR HOLDING A PERMANENT MAGNET

(71) Applicants: HYUNDAI MOTOR COMPANY, Seoul (KR); KIA MOTORS CORPORATION, Seoul (KR)

(72) Inventors: Kyung Soo Park, Daejeon (KR); Jung Woo Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 148 days.

(21) Appl. No.: 17/019,650

(22) Filed: Sep. 14, 2020

(65) Prior Publication Data
US 2021/0184522 A1    Jun. 17, 2021

(30) Foreign Application Priority Data
Dec. 17, 2019   (KR) .......................... 10-2019-0168626

(51) Int. Cl.
    *H02K 1/27*     (2022.01)
    *H02K 1/276*    (2022.01)
    *H02K 15/03*    (2006.01)
    *H02K 21/16*    (2006.01)
    *H02K 1/30*     (2006.01)

(52) U.S. Cl.
    CPC ............. *H02K 1/2766* (2013.01); *H02K 1/30* (2013.01); *H02K 15/03* (2013.01); *H02K 21/16* (2013.01)

(58) Field of Classification Search
    CPC ........ H02K 1/276; H02K 1/2766; H02K 1/28; H02K 1/30; H02K 15/03; H02K 21/16; H02K 21/14; B60L 2220/10
    See application file for complete search history.

(56) References Cited

U.S. PATENT DOCUMENTS

| | | | |
|---|---|---|---|
| 9,755,489 B2 | 9/2017 | Takemoto et al. | |
| 10,020,700 B2 | 7/2018 | Fubuki | |
| 2013/0113328 A1* | 5/2013 | Kogure | H02K 1/274 310/156.53 |
| 2015/0270749 A1* | 9/2015 | Mochida | H02K 1/276 310/156.53 |
| 2016/0248286 A1* | 8/2016 | Kaiser | H02K 1/2766 |
| 2020/0127508 A1* | 4/2020 | Dlala | H02K 1/2766 |
| 2020/0412192 A1* | 12/2020 | Wu | H02K 1/2766 |
| 2021/0091630 A1* | 3/2021 | Lahr | H02K 1/276 |

FOREIGN PATENT DOCUMENTS

| | | |
|---|---|---|
| JP | 6190219 B2 | 8/2017 |
| KR | 10-1736553 B1 | 5/2017 |

* cited by examiner

*Primary Examiner* — Thomas Truong
(74) *Attorney, Agent, or Firm* — McDonnell Boehnen Hulbert & Berghoff LLP

(57) ABSTRACT

Provided is a rotor for application in a drive motor that includes multiple cores of the rotor that define a plurality of slots into each of which a permanent magnet is inserted, in which the cores of the rotor include a first core in which fixation jaws for holding in place one surface of the permanent magnet and the other surface opposite to the one surface in a direction of extension of the permanent magnet are disposed, and a second core in which fixation jaws for holding in place one surface of the one surface of the permanent magnet and the other surface opposite to the one surface in the direction of the extension of the permanent magnet are disposed.

13 Claims, 7 Drawing Sheets

ROTOR DRIVE APPLIED TO DRIVE MOTOR WITH A STRUCTURE IN WHICH REMOVES A FIXATION JAWS FOR HOLDING A PERMANENT MAGNET

CROSS REFERENCE TO RELATED APPLICATIONS

The present application claims priority to Korean Patent Application No. 10-2019-0168626, filed Dec. 17, 2019, the entire contents of which is incorporated herein for all purposes by this reference.

BACKGROUND

Field

The present disclosure relates to a rotor in which cores of the rotor, each with fixation jaws for holding a permanent magnet in place, are stacked. More particularly, the present disclosure relates to a rotor for application in a drive motor, in which cores of the rotor have different numbers of fixation jaws.

Description of the Related Art

High efficiency and output density are required of a drive motor for application in environment-friendly vehicles. Particularly, electric vehicles (EV) are required to obtain all vehicle motive-power from a drive motor, and therefore, required amounts of torque and output of the drive motor are further increased. In the past, the electric vehicles were limited to a passenger vehicle, but these days, include sports cars, trucks, buses, and so on. Thus, the amounts of torque and output are further increased. However, in order to provide large amounts of torque and output within a limited space in a vehicle, smaller-sized drive motors have to be designed.

Generally, embedded permanent magnet synchronization motors are used as drive motors for environment-friendly vehicles. A feature of the permanent magnet synchronization motor is a structure in which a permanent magnet is inserted into a core of a rotor and is held in place by a magnetic fixation jaw. For miniaturization of the drive motor, a fixation jaw that holds the permanent magnet in place finds application in the drive motor. However, as leakage of a magnetic flux increases at a position where the fixation jaw is provided, torque density decreases. Thus, the performance of the drive motor decreases. In a case where an amount of usage that the permanent magnet experiences is increased in order to compensate for a decrease in the torque of the drive motor, an increase in a material cost for the drive motor leads to a decrease in cost competitiveness. In a case where an amount of electric current is increased in order to compensate for the decrease in the torque of the drive motor, a cost for inverter elements is increased and in that the efficiency is decreased.

SUMMARY

An objective of the present disclosure is to provide a rotor for application in a drive motor, which is capable of minimizing the number of fixation jaws for application in the drive motor and thus minimizing leakage of a magnetic flux.

According to an aspect of the present disclosure, there is provided a rotor for application in a drive motor. In the rotor for application in a drive motor that includes a plurality of rotor cores that define many slots into each of which a permanent magnet is inserted, the rotor cores include a first core in which fixation jaws for holding in place one surface of the permanent magnet and the other surface opposite to the one surface in a direction of extension of the permanent magnet are disposed, and a second core in which fixation jaws for holding in place one surface of the one surface of the permanent magnet and the other surface opposite to the one surface in the direction of the extension of the permanent magnet are disposed.

According to the aspect of the present disclosure, in the rotor, the one surface may be a surface adjacent to a rotation shaft hole defined in the rotor and the other surface is a surface opposite the one surface, and the second core may include the fixation jaws for holding the other surface of the permanent magnet in place.

According to the aspect of the present disclosure, in the rotor, the fixation jaws may be provided in one or several slots among the slots in the second core and thus may hold the other surface of the permanent magnet in place.

According to the aspect of the present disclosure, in the rotor, the fixation jaw that is provided in the second core may not be brought into contact with the one surface of the permanent magnet that is provided in each of the slots in the second core.

According to the aspect of the present disclosure, the rotor may further include a third core that includes the fixation jaws for holding in place the other surface of the permanent magnet that is inserted into each of the one or several slots among the slots, in which the rotor may be configured in such a manner that at least one or more of the first cores, at least one or more of the second cores, and at least one or more of the third cores are stacked.

According to the aspect of the present disclosure, in the rotor, the permanent magnets may include sets of paired permanent magnets that are symmetrical with respect to a D axis of the drive motor, and the sets of permanent magnets may include two sets of permanent magnets overlapping in a radial direction with respect of a rotation shaft hole defined in the rotor.

According to the aspect of the present disclosure, in the rotor, the second core may include fixation jaws that are brought into contact with the respective other surfaces of first permanent magnets in a set, which are adjacent to the rotation shaft hole, and the respective other surfaces of second permanent magnets in a set, which are disposed in a direction of opposite the rotation shaft hole with respect to the first permanent magnets in a set.

According to the aspect of the present disclosure, in the rotor, the second core may include fixation jaws that are brought into contact with the respective other surfaces of the first permanent magnets in a set, which are adjacent to the rotation shaft hole, and the fixation jaws of the second core may not be brought into contact with the respective other surfaces of the second permanent magnets in a set, which are disposed in a direction of opposite the rotation shaft hole with respect to the first permanent magnets in a set.

According to the aspect of the present disclosure, in the rotor, the first core and the second core may be stacked in a direction of extension of a rotation shaft of the rotor, and the cores of the rotor may include at least one or more of the first cores.

According to the aspect of the present disclosure, in the rotor, the second cores may be provided in greater number than the first cores.

According to the aspect of the present disclosure, in the rotor, the number of the fixation jaws that are provided in the first core may be greater than the number of the fixation jaws that are provided in the second core.

According to the aspect of the present disclosure, in the rotor, an empty space that is defined after the permanent magnet may be inserted into the slot is defined as a barrier, and the barrier may be filled with epoxy resin.

According to the aspect of the present disclosure, in the rotor, the first core may be disposed on the respective uppermost portions and lowermost portions of the cores of the rotor.

According to the aspect of the present disclosure, in the rotor, the first core and the second core may be alternately stacked.

According to an embodiment of the present disclosure, a rotor is configured in such a manner that a first core and a second core that have different numbers of fixation jaws in order to minimize the number of fixation jaws for application in the rotor are mixed. Therefore, only with a minimized number of the fixation jaws, the rotor can hold permanent magnets in place and can decrease the number of the fixation jaws, thereby minimizing leakage of a magnetic flux of a drive motor.

According to an embodiment of the present disclosure, a second core in which a second fixation jaw disposed adjacent to a rotation shaft is removed are provided in the rotor. Thus, the leakage of the magnetic flux of the drive motor can be reduced. Furthermore, a first fixation jaw on which stress of the permanent magnet due to rotation of the rotor exerts an influence is disposed in both the first core and the second core. Thus, holding forces that hold the permanent magnets in place can be maintained.

DETAILED DESCRIPTION

Figure 1:
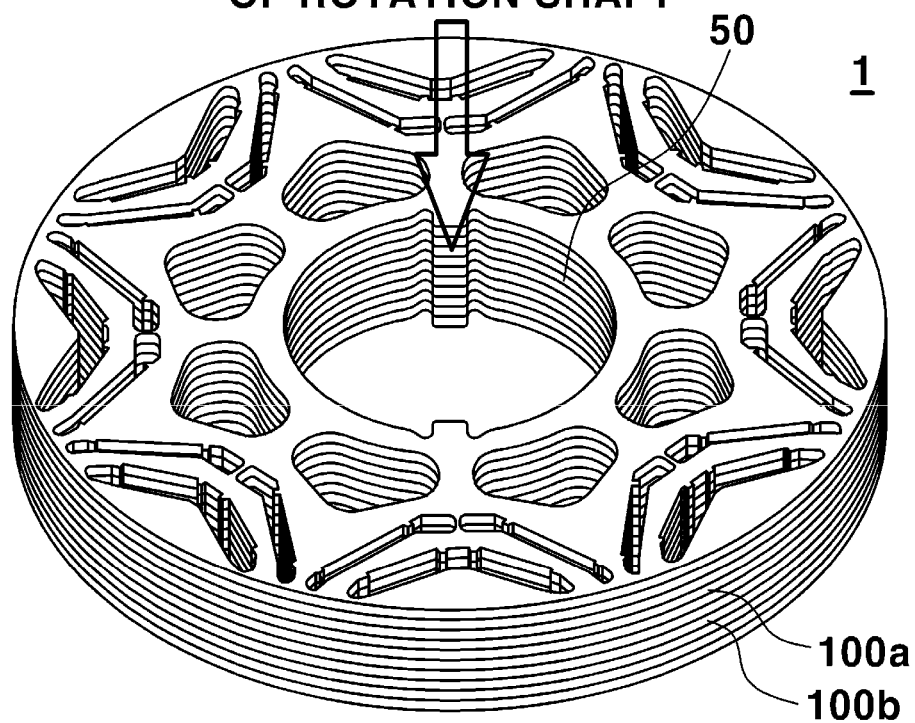
FIG. 1 is a diagram illustrating a structure in which cores of a rotor according to an embodiment of the present disclosure are stacked.

Advantages and features of the present disclosure, and methods of achieving the advantages and the features will be apparent from the accompanying drawings and from embodiments that will be described in detail below. However, the present disclosure is not limited to the embodiments that will be disclosed below, and various different embodiments thereof can be realized. The embodiments are provided to make a complete disclosure of the present disclosure and to put a person of ordinary skill in the art to which the present disclosure pertains on full notice as to the scope of the disclosure. However, the scope of the present disclosure should be only defined in claims. The same reference character throughout the specification refers to the same constituent element.

In addition, in order to distinguish among constituent elements that have the same name, the terms first, second, and so on are used throughout the present specification. In the following description, no limitation to this order is necessarily imposed.

The present disclosure is described in detail in an illustrative manner. In addition, the above description is provided for preferable embodiments of the present disclosure, and the present disclosure may be implemented, in various different combinations with various different alterations, under various different environments. Modifications or alterations to the disclosure are possible within the scope of the concept of the disclosure disclosed in the present specification, the scope of equivalents of the contents of the described disclosure, and/or the scope of technologies or knowledge in the art. Optimal requirements for realizing the technical idea of the present disclosure are described for the embodiments. Various modifications that are required in the field in which the present disclosure finds application and that are required to use the present disclosure are possible as well. Therefore, the above detailed description relating to the disclosure is not intended to impose any limitation to the disclosed embodiments. In addition, the claims should be construed to cover other embodiments as well.

FIG. 1 is a diagram illustrating a structure in which cores of a rotor for application in a drive motor according to an embodiment of the present disclosure are stacked.

With reference to FIG. 1, a rotor 1 is configured in such a manner that a first core 100*a* and a second core 100*b* are stacked in a mixed manner. The rotor 1 may be configured in such a manner that several tens of or several hundreds of first cores 100*a* and several tens or several hundreds of second cores 100*b* are stacked. The first core 100*a* and the second core 100*b* are stacked along a direction of extension of a rotation shaft that is inserted into a rotation shaft hole 50. The first core 100*a* and the second core 100*b* overlap in a perpendicular direction to the drawing sheet.

Generally, the cores of the rotor that make up the rotor 1 have the same shape. However, according to an embodiment of the present disclosure, the rotor 1 is configured in such a manner that the cores of the rotor, which have different shapes, are stacked. The cores of the rotor (the first core 100*a* and the second core 100*b*) have slots in common into each of which a permanent magnet is inserted. However, the first cores 100*a* and the second cores 100*b* have different numbers of fixation jaws that hold the permanent magnets in place. Each of the first core 100*a* and the second core 100*b* has the fixation jaws. However, the number of the fixation jaws that are provided in the first core 100*a* and the number of the fixation jaws that are provided in the second core 100*b* are different from each other. The fixation jaw will be described in detail below.

Figure 2:
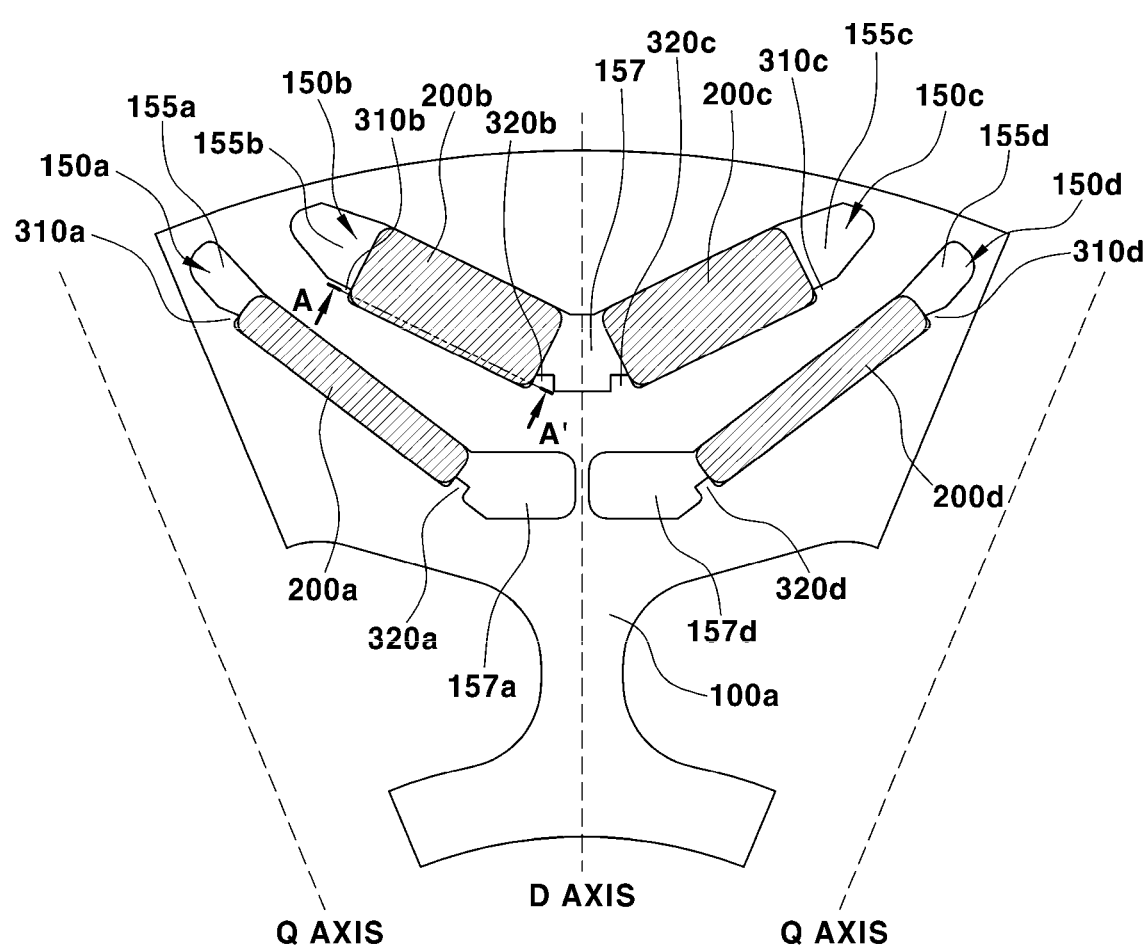
FIG. 2 is a diagram illustrating an example of a core of a rotor according to an embodiment of the present disclosure.

FIG. 2 is a diagram illustrating an example of a core of a rotor according to an embodiment of the present disclosure.

With reference to FIGS. 1 and 2, the first core 100*a*, multiple slots, slots 150*a*, 150*b*, 150*c*, and 150*d*, and multiple permanent magnets, permanent magnets 200*a*, 200*b*, 200*c*, and 200*d*, multiple first fixation jaws, first fixation jaws 310*a*, 310*b*, 310*c*, and 310*d*, and multiple second fixation jaws, second fixation jaws 320*a*, 320*b*, 320*c*, and 320*d* are included. The first core 100*a* in FIG. 2 is illustrated as one portion that makes up one pole, and four permanent magnets, permanent magnets 200a, 200b, 200c, and 200d make up one pole of the drive motor.

Slots 150a, 150b, 150c, and 150d are formed in the first core 100a. The slots 150a, 150b, 150c, and 150d mean the perspective spaces of the permanent magnets 200a, 200b, 200c, and 200d, and vary widely in shape and number. According to the present embodiment, the slots 150a and 150d in combination are provided in a V-shaped form, and the slots 150b and 150c in combination are also provided in a V-shaped form. After the permanent magnets 200a, 200b, 200c, and 200d, are inserted into the slots 150a, 150b, 150c, and 150d, respectively, there are left empty spaces in the permanent magnets 200a, 200b, 200c, and 200d. Empty spaces that are defined after the permanent magnets 200a, 200b, 200c, and 200d, the first fixation jaws 310a, 310b, 310c, and 310d, and the second fixation jaws 320a, 320b, 320c, and 320d, are disposed in the slots 150a, 150b, 150c, and 150d, respectively, are barriers 155a, 155b, 155c, 155d, 157, 157a, and 157d, respectively. The barriers 155a, 155b, 155c, 155d, 157, 157a, and 157d include first barriers 155a, 155b, 155c, and 155d which are defined in the upper portion of the permanent magnets 200a, 200b, 200c, and 200d, and second barriers 157, 157a, and 157d, which are defined in the lower portion of the permanent magnets 200a, 200b, 200c, and 200d. The first barriers 155a, 155b, 155c, and 155d are disposed distances apart. The second barriers 157, 157a, and 157d are disposed distances apart. The first barriers 155a, 155b and 155c, and 155d, are disposed distances apart from the second barriers 157a, 157 and 157d, respectively. The barriers 155a, 155b, 155c, 155d, 157, 157a, and 157d are filled with epoxy resin or air, and therefore, an amount of leakage of magnetic fluxes occurring in the permanent magnets 200a, 200b, 200c, and 200d through the first core 100a is minimized.

Four permanent magnets, the permanent magnets 200a, 200b, 200c, and 200d are disposed in the slots 150a, 150b, 150c, and 150d, respectively. The first permanent magnet 200a is inserted into the first 150a. The second permanent magnet 200b is inserted into the second slot 150b. The third permanent magnet 200c is inserted into the third slot 150c. The fourth permanent magnet 200d is inserted into the fourth slot 150d. Each of the permanent magnets 200a, 200b, 200c, and 200d have a first surface, a second surface, a third surface, and a fourth surface.

As an example, the permanent magnets 200a, 200b, 200c, and 200d include sets of paired permanent magnets. According to the present embodiment, the first permanent magnet 200a and the fourth permanent magnet 200d are paired, and the second permanent magnet 200b and the third permanent magnet 200c are paired. That is, one pair of permanent magnets is disposed in a V-shaped form. The permanent magnets 200a, 200b, 200c, and 200d include sets of paired permanent magnets that are symmetrical with respect to a D axis of the drive motor. The sets of permanent magnets include two sets of permanent magnets overlapping in a radial direction with respect to the rotation shaft hole 50 defined in the rotor 1. Surfaces of paired permanent magnets that face each other are defined as first surfaces, and surfaces opposite the first surfaces, respectively, are defined as second surfaces. The D axis is an axis from which a magnetic flux of the drive motor and is an axis that is defined in a space between one pair of permanent magnets. A Q axis is an axis that is 90 degrees counterclockwise ahead of the D axis and is an axis that is defined in a space outside of one pair of permanent magnets. The first surfaces are inner surfaces with respect to one pair of permanent magnets, and the second surfaces are outer surfaces with respect to one pair of permanent magnets. In addition, the permanent magnets 200a, 200b, 200c, and 200d have the respective third surface and the fourth surface that face each other in a direction of extension of the permanent magnets 200a, 200b, 200c, and 200d, respectively. The respective fourth surfaces of the permanent magnets 200a, 200b, 200c, and 200d are adjacent to the first barriers 155a, 155b, 155c, and 155d, respectively, and the respective third surfaces of the permanent magnets 200a, 200b and 200c, and 200d are adjacent to the second barriers 157a, 157 and 157d, respectively.

The first fixation jaws 310a, 310b, 310c, and 310d and the second fixation jaws 320a, 320b, 320c, and 320d are disposed in the slots 150a, 150b, 150c, and 150d, respectively. The first fixation jaws 310a, 310b, 310c, and 310d and the second fixation jaws 320a, 320b, 320c, and 320d guide the respective directions in which the permanent magnets 200a, 200b, 200c, and 200d, respectively, are disposed, and the permanent magnets 200a, 200b, 200c, and 200d are held in place within the slots 150a, 150b, 150c, and 150d, respectively. The first fixation jaws 310a, 310b, 310c, and 310d are brought into contact with the respective surfaces of the permanent magnets 200a, 200b, 200c, and 200d. The second fixation jaws 320a, 320b, 320c, and 320d are brought into contact with the respective other surfaces thereof, which are opposite the respective surfaces in a direction of extension thereof. Thus, the permanent magnets 200a, 200b, 200c, and 200d are held in place. In addition, the first fixation jaws 310a, 310b, 310c, and 310d and the second fixation jaws 320a, 320b, 320c, and 320d are disposed on the respective other surfaces, respectively, of the slots 150a, 150b, 150c, and 150d, which are brought into contact with the respective second surfaces of the permanent magnets 200a, 200b, 200c, and 200d. Specifically, the first fixation jaws 310a, 310b, 310c, and 310d are brought into contact with the respective fourth surfaces of the permanent magnets 200a, 200b, 200c, and 200d. The second fixation jaws 320a, 320b, 320c, and 320d are brought into contact with the respective third surfaces of the permanent magnets 200a, 200b, 200c, and 200d. In addition, the first fixation jaws 310a, 310b, 310c, and 310d are adjacent to the first barriers 155a, 155b, 155c, and 155d, respectively, and the second fixation jaws 320a, 320b and 320c, and 320d are adjacent to the second barriers 157a, 157, and 157d, respectively.

As an example, the first fixation jaws 310a, 310b, 310c, and 310d and the second fixation jaws 320a, 320b, 320c, and 320d are configured to protrude from the respective surfaces, respectively, of the slots 150a, 150b, 150c, and 150d, which are brought into contact with the respective second surfaces (outer surfaces) of the permanent magnets 200a, 200b, 200c, and 200d, toward the respective other surfaces of the slots 150a, 150b, 150c, and 150d.

Figure 3:
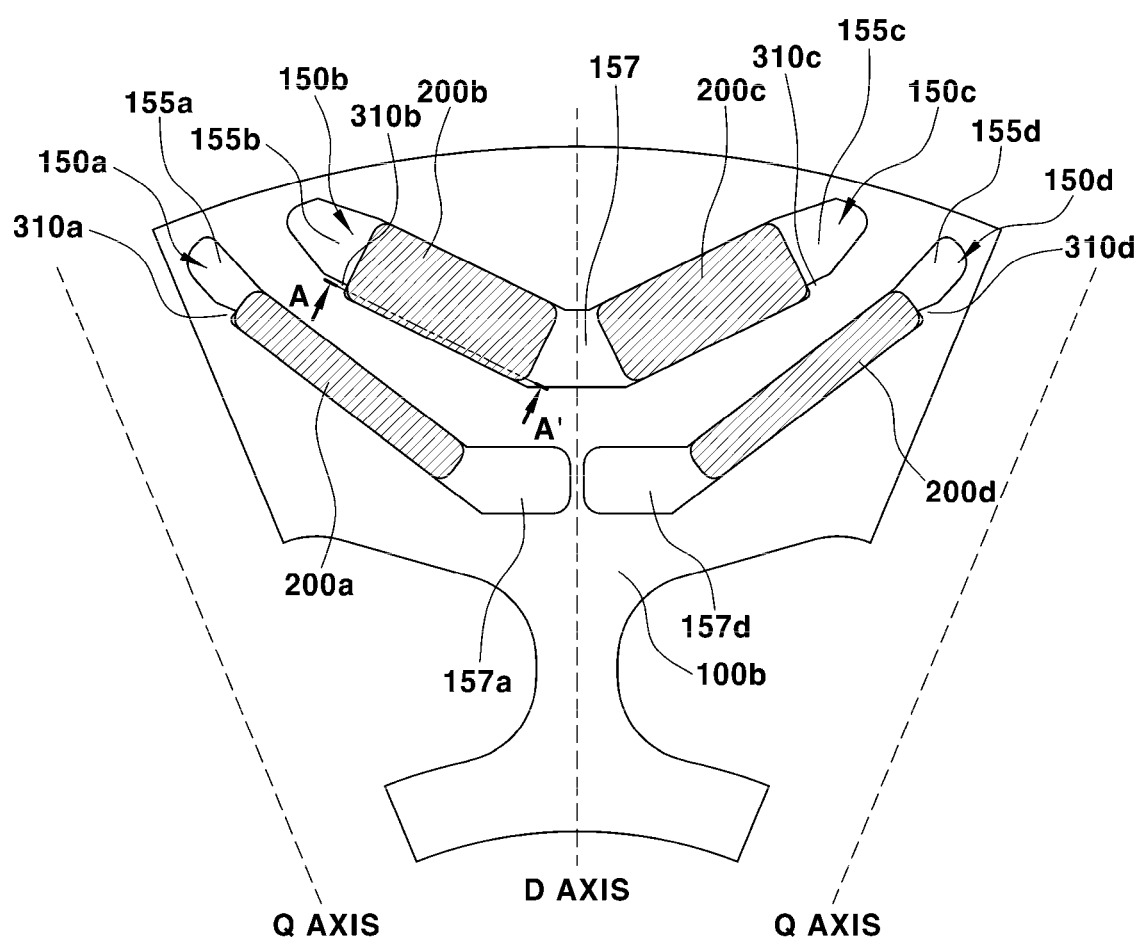
FIG. 3 is a diagram illustrating another example of the core of the rotor according to the embodiment of the present disclosure.

FIG. 3 is a diagram illustrating another example of the core of the rotor according to the embodiment of the present disclosure.

With reference to FIGS. 1 to 3, the second core 100b has a structure in which the second core 100b results from removing the second fixation jaws 320a, 320b, 320c, and 320d from the first core 100a. The second core 100b has only the first fixation jaws 310a, 310b, 310c, and 310d. The first fixation jaws 310a, 310b, 310c, and 310d are brought into contact with at least the respective surfaces (the respective third surfaces) of the permanent magnets 200a, 200b, 200c, and 200d, or the respective other surfaces (the respective fourth surfaces) thereof in the direction of the extension thereof. Thus, the permanent magnets 200a, 200b, 200c, and 200d are held in place. Preferably, the first fixation jaws 310a, 310b, 310c, and 310d are brought into contact with the respective other surfaces (the respective fourth surfaces) of the permanent magnets 200a, 200b, 200c, and 200d in the direction of the extension thereof. That is, the first fixation jaws 310a, 310b, 310c, and 310d are brought into contact with the respective other surfaces (the respective fourth surfaces) of the permanent magnets 200a, 200b, 200c, and 200d, which are present outermost from the rotation shaft hole 50. In other words, surfaces that are brought into contact with the first fixation jaws 310a, 310b, 310c, and 310d are the respective other surfaces of the permanent magnets 200a, 200b, 200c, and 200d, which are disposed to be present outermost from the rotation shaft hole 50. With the rotation of the rotor 1, the permanent magnets 200a, 200b, 200c, and 200d generate stress in a direction of moving away from the rotation shaft hole 50 (in the directions from the respective inner ends of the permanent magnets 200a, 200b, 200c, and 200d to the respective outer ends). Therefore, with the first fixation jaws 310a, 310b, 310c, and 310d, the second core 100b holds the permanent magnets 200a, 200b, 200c, and 200d, respectively, in place, and withstand the stress generated by the permanent magnets 200a, 200b, 200c, and 200d. The stress does not relatively act inward in the directions from the respective outer ends of the permanent magnets 200a, 200b, 200c, and 200d to the respective inner ends, relative to the rotation shaft hole 50. Therefore, although the second fixation jaws 320a, 320b, 320c, and 320d, among the first fixation jaws 310a, 310b, 310c, and 310d and the second fixation jaws 320a, 320b, 320c, and 320d, are removed, the respective holding forces that hold the permanent magnets 200a, 200b, 200c, and 200d in place are maintained. The second core 100b according to an embodiment of the present disclosure has a structure in which the second fixation jaws 320a, 320b, 320c, and 320d are removed in order to minimize the leakage of the magnetic fluxes while maintaining the holding forces that hold the permanent magnets 200a, 200b, 200c, and 200d in place.

Figure 4:
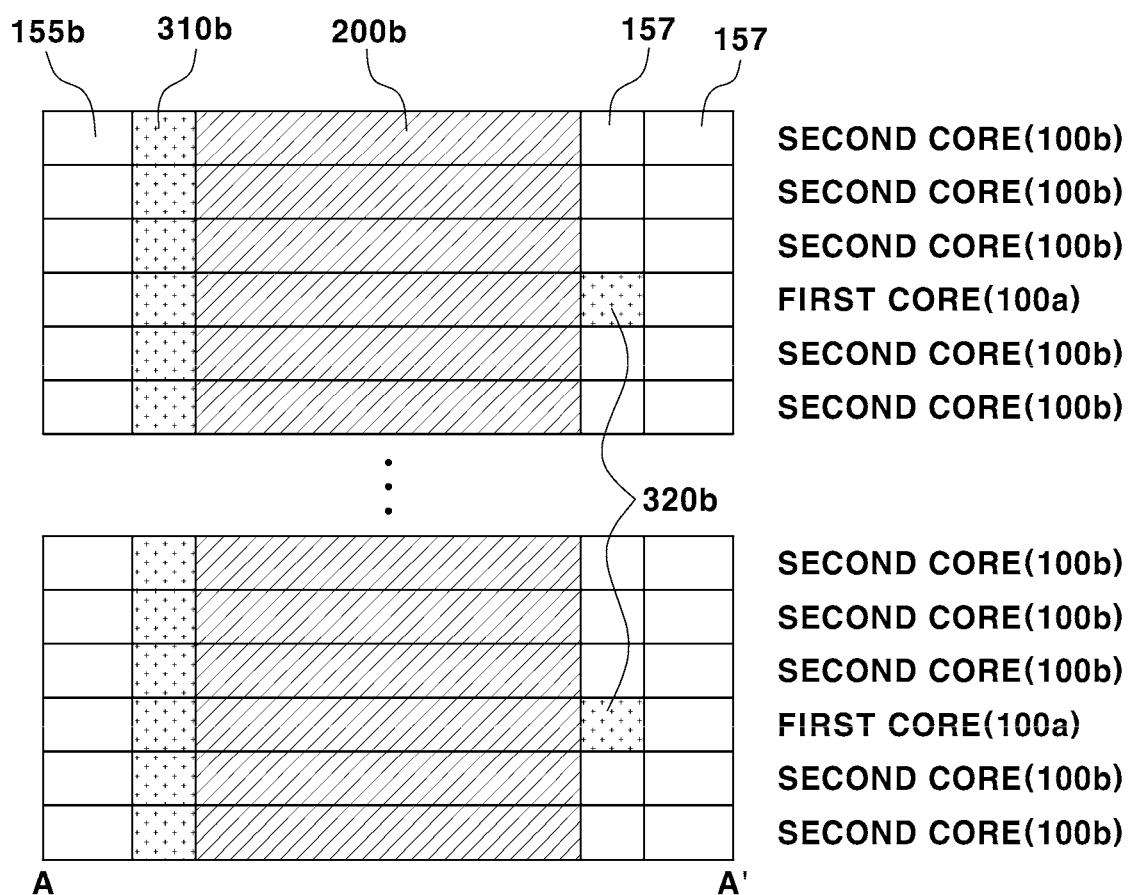
FIG. 4 is a diagram illustrating an example of a structure in which the cores of the rotor according to the embodiment of the present disclosure are stacked.

FIG. 4 is a diagram illustrating an example of the structure in which the cores of the rotor according to the embodiment of the present disclosure are stacked. FIG. 4 is a cross-sectional diagram taken along line A-A' in FIG. 2.

With reference to FIGS. 1 to 4, the rotor 1 is configured in such a manner that the first core 100a and the second core 100b are stacked in a mixed manner. The first core 100a is illustrated in FIG. 2, and the second core 100b is illustrated in FIG. 3. The first core 100a has a greater number of fixation jaws than the second core 100b.

The rotor 1 has a structure in which a great number of the second cores 100b and a small number of the first cores 100a are stacked. The rotor 1 has at least one or more first cores 100a. The first core 100a has the first fixation jaw 310b and the second fixation jaw 320b, and the second core 100b has only the first fixation jaw 310b.

The barrier 157 is filled with epoxy resin or air, and therefore, an amount of leakage of a magnetic flux occurring in the permanent magnet 200b through the first core 100a and the second core 100b is minimized. The leakage of the leakage is minimized by the barrier 157 because air and epoxy resin have less transmittance than a magnetic body. For example, when the transmittance of air is defined as approximately 1, the transmittance of iron that makes up the first core 100a and the second core 100b is 280,000. In this case, due to the first fixation jaw 310b and the second fixation jaw 320b of the first core 100a and the first fixation jaw 310b of the second core 100b, the leakage of magnetic fluxes occurs in positions of these fixation jaws. This leads to a reduction in torque density and thus decreases the performance of the drive motor.

The magnetic flux leaks in proportion to the transmittance, and a leakage flux is defined according to the following equation.

$$\Phi = \frac{F}{R}$$

$$R = \frac{1}{\mu \cdot A}$$

where $\Phi$ denotes a magnetic flux, F denotes a magnetomotive force, R denotes magnetic reluctance, I denotes a distance, A denotes an area, and $\mu$ denotes transmittance. The distance and the area mean the respective length and area of the barrier 157.

According to an embodiment of the present disclosure, in order to minimize the number of fixation jaws for application in the rotor 1, the first fixation jaw 310b and the second fixation jaw 320b are disposed in the first core 100a, and the first core 100a and the second core 100b are formed in such a manner that only the first fixation jaw 310b is disposed in the second core 100b. In addition, the rotor 1 is configured in such a manner that a small number of the first cores 100a, each with a relatively great number of fixation jaws, and a great number of the second cores 100b, each with a relatively small number of fixation jaws, are stacked. Therefore, only with a minimum number of fixation jaws, the rotor 1 holds the permanent magnet 200b in place, and a decrease in the number of fixation jaws minimizes the leakage of the magnetic flux.

In addition, according to an embodiment of the present disclosure, the rotor 1 is designed to have a structure in which, in order to support the permanent magnets 200a, 200b, 200c, and 200d when the rotor 1 rotates, the first fixation jaws 310a, 310b, 310c, and 310d are provided in each of the first core 100a and the second core 100b, and in which the second fixation jaws 320a, 320b, 320c, and 320d on which the stress exerts a relatively less influence are removed when possible. That is, the second fixation jaws 310a, 310b, 310c, and 310d are removed in the second core 100b, and thus the leakage of the magnetic flux through the first core 100a and the second core 100b is minimized.

Unlike as in the example described above, the first core 100a and the second core 100b are stacked in an alternating manner. Accordingly, although the second core 100b in which the second fixation jaws 310a, 310b, 310c, and 310d are removed, and the first core 100a are stacked in a mixed manner, the permanent magnets 200a, 200b, 200c, and 200d are held in place.

Figure 5:
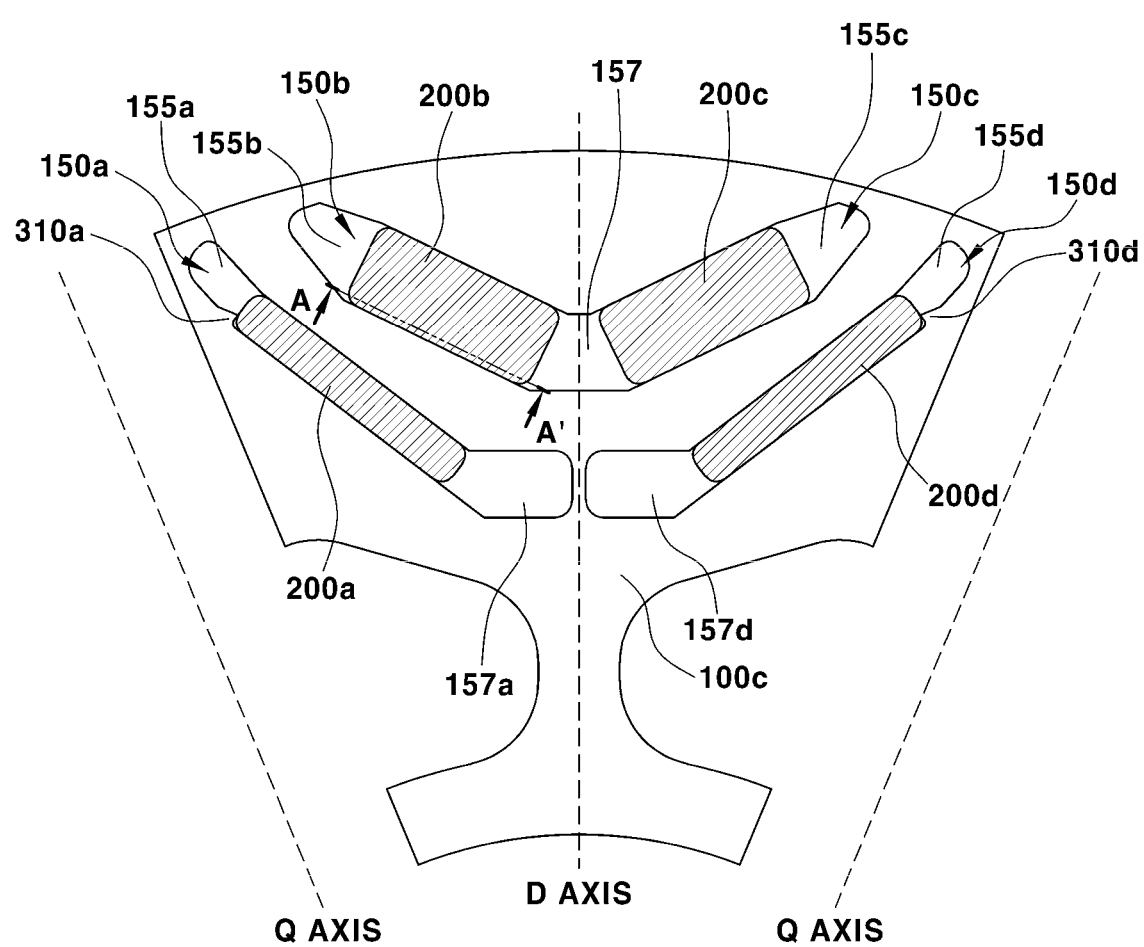
FIG. 5 is a diagram illustrating still another example of the core of the rotor according to the embodiment of control present disclosure.
Figure 6:
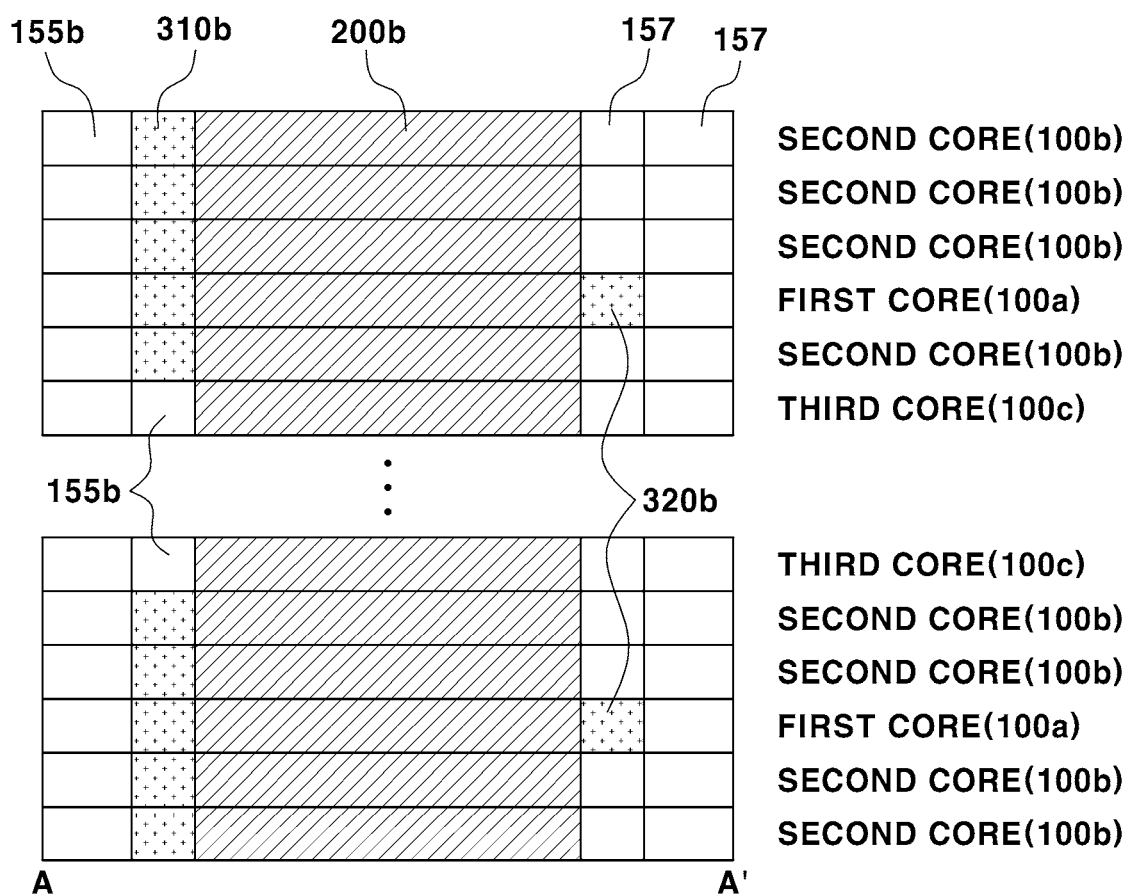
FIG. 6 is a diagram illustrating another example of the structure in which the cores of the rotor according to the embodiment of the present disclosure are stacked.

FIG. 5 is a diagram illustrating still another example of the core of the rotor according to the embodiment of the present disclosure. FIG. 6 is a diagram illustrating another example of the structure in which the cores of the rotor according to the embodiment of the present disclosure are stacked.

With reference to FIGS. 1 to 3, 5, and 6, the third core 100c that has a different shape than the first core 100a and the second core 100b are provided. The third core 100c has a structure in which the second fixation jaws 310a, 310b, 310c, and 310d that hold the respective surfaces of the permanent magnets 200a, 200b, 200c, and 200d in place and the first fixation jaws 310b and 310c that hold the respective other surfaces of the second permanent magnet 200b and the third permanent magnet 200c in place are removed. The first fixation jaws 310a and 310d that are provided in the slot 150a and the 150d, among the slots 150a, 150b, 150c, and 150d, to hold the permanent magnets 200a and 200d, respectively, in place, are disposed in the third core 100c. However, the other fixation jaws, that is, the first fixation jaws 310b and 310c that are provided in the slots 150b and 150c, among the slots 150a, 150b, 150c, and 150d, to hold the permanent magnets 200b and 200c, respectively, in place, are not disposed in the third core 100c. That is, the third core 100c includes the first fixation jaws 310a and 310d that are brought into contact with the respective other surfaces of the first permanent magnets 200a and 200d in a set. However, the first fixation jaws 310b and 310c that are brought into contact with the respective other surfaces of the second permanent magnets 200b and 200c that are disposed in a direction of opposite the rotation shaft hole 50 with respect to the first permanent magnets 200a and 200d in a set are not provided.

The rotor 1 is configured in such a manner that at least one or more of the first cores 100a, at least one or more of the second cores 100b, and at least one or more of the third cores 100c are stacked. In this case, the number of the stacked first cores 100a is smaller than the number of the stacked second cores 100b and the number of the stacked third cores 100c. The second core 100b is provided on the upper most portion and the lowermost portion of the core of the rotor that makes up the rotor 1.

According to an embodiment of the present disclosure, in order to form the rotor 1, many second cores 100b and third cores 100c, each with a relatively small number of provided fixation jaws, and a small number of the first cores 100a, each with a relatively great number of provided fixation jaws, are stacked. In a case where the rotor 1 according to the present disclosure finds application in the drive motor, the permanent magnets 200a, 200b, 200c, and 200d are held in place through a number of fixation jaws that is held to a minimum, and the leakage of the magnetic flux in the driver motor is minimized.

Figure 7:
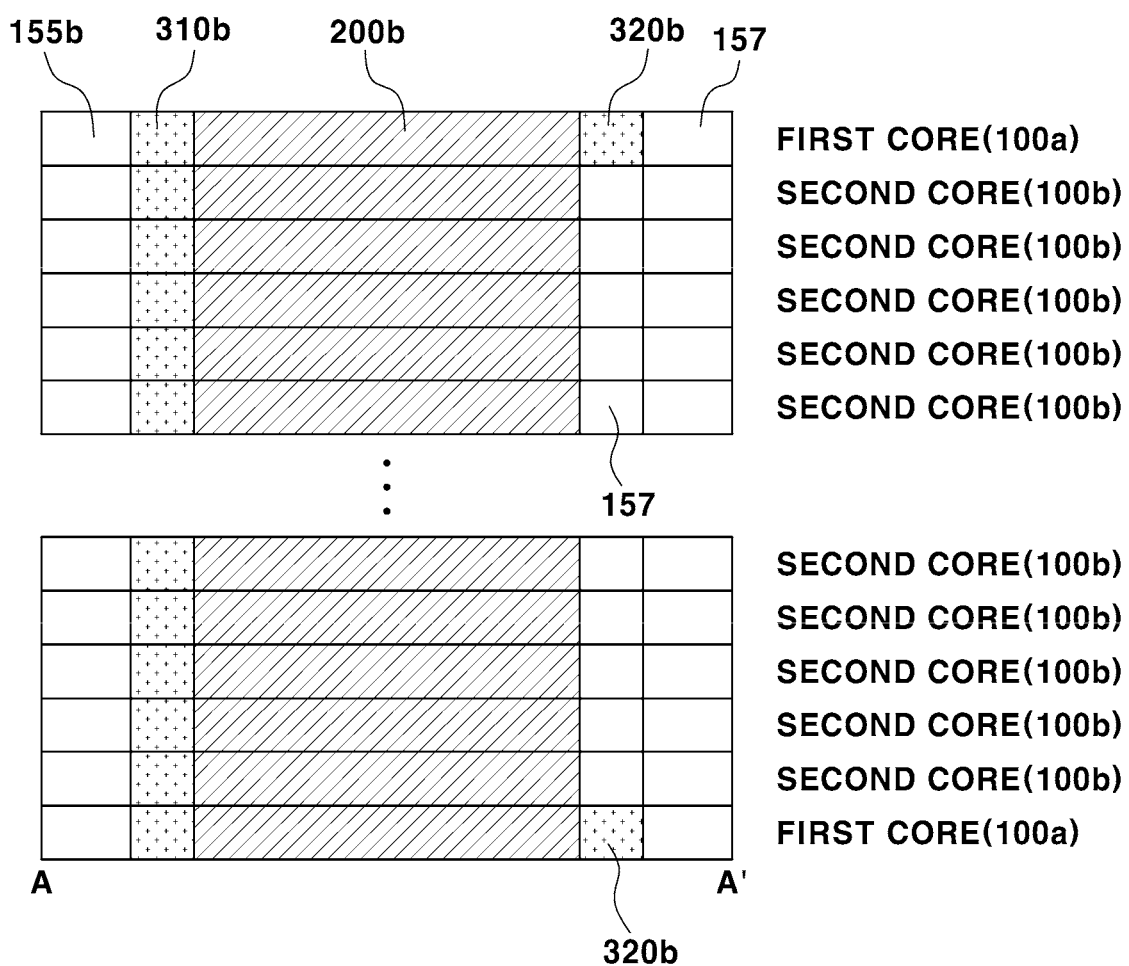
FIG. 7 is a diagram illustrating still another example of the structure in which the cores of the rotor according to the embodiment of the present disclosure are stacked.

FIG. 7 is a diagram illustrating still another example of the structure in which the cores of the rotor according to the embodiment of the present disclosure are stacked.

With reference to FIGS. 1, 2, and 7, the first core 100a is disposed on the respective uppermost portions and lowermost portions of the cores of the rotor that make up the rotor 1. The uppermost portions and the lowermost portions are decided on the basis of the direction of the extension of the rotation shaft. The first core 100a includes all of the first fixation jaws 310a, 310b, 310c, and 310d and of the second fixation jaws 320a, 320b, 320c, and 320d for holding the permanent magnets 200a, 200b, 200c, and 200d in place. The first core 100a is disposed on the respective uppermost portions and lowermost portions of the cores of the rotor, and thus the holding forces that hold the permanent magnets 200a, 200b, 200c, and 200d in place are increased. In addition, the second cores 100b are disposed between the first cores 100a that are disposed on the respective uppermost portions and lowermost portions of the cores of the rotor, and the leakage of the magnetic flux in the drive motor is minimized.

The embodiments of the present disclosure are described above with reference to the accompanying drawings, and it will be apparent to a person of ordinary skill in the art to which the present disclosure pertains that the present disclosure can be implemented into other embodiments without modification to the technical idea and essential feature thereof. Therefore, it should be understood that, in every aspect, the embodiments described above are exemplary and are not restrictive.

The invention claimed is:

1. A rotor for application in a drive motor that includes a plurality of rotor cores, each of the plurality of rotor cores defines a plurality of slots, each slot having permanent magnets inserted therein, wherein the plurality of the rotor cores comprise:
   a first core including a plurality of fixation jaws for holding in place one surface of the permanent magnets and an opposite surface in a direction of extension of the permanent magnets; and
   a second core including a plurality of fixation jaws for holding in place the opposite surface in the direction of the extension of the permanent magnets;
   wherein the first core and the second core have different numbers of the plurality of fixation jaws that hold the permanent magnets in place; and
   wherein the one surface is a surface adjacent to a rotation shaft hole defined in the rotor, and the opposite surface is a surface opposite to the one surface.

2. The rotor according to claim 1, wherein the fixation jaws are positioned in one or more slots among the slots in the second core, and hold the opposite surface of the permanent magnets in place.

3. The rotor according to claim 1, wherein the plurality of fixation jaws in the second core are not brought into contact with the one surface of the permanent magnets that is provided in each of the slots in the second core.

4. The rotor according to claim 1, further comprising:
   a third core including a plurality of fixation jaws for holding in place the opposite surface of the permanent magnets that is inserted into each of the one or more slots among the slots, wherein the rotor is configured such that at least one or more of the first cores, at least one or more of the second cores, and at least one or more of the third cores are stacked.

5. The rotor according to claim 1, wherein the permanent magnets include sets of paired permanent magnets that are symmetrical with respect to a D axis of the drive motor; and
   the sets of permanent magnets include two sets of permanent magnets overlapping in a radial direction with respect to a rotation shaft hole defined in the rotor.

6. The rotor according to claim 5, wherein the second core comprises:
   fixation jaws that are brought into contact with the respective opposite surfaces of first permanent magnets in a set, which are adjacent to the rotation shaft hole, and the respective other surfaces of second permanent magnets in a set, which are disposed in a direction opposite the rotation shaft hole with respect to the first permanent magnets in a set.

7. The rotor according to claim 5, wherein the second core includes fixation jaws that are brought into contact with the respective opposite surfaces of the first permanent magnets in a set, which are adjacent to the rotation shaft hole, and
   the fixation jaws of the second core are not brought into contact with the respective opposite surfaces of the second permanent magnets in a set, which are disposed in a direction opposite the rotation shaft hole with respect to the first permanent magnets in a set.

8. The rotor according to claim 1, wherein the first core and the second core are stacked in a direction of extension of a rotation shaft of the rotor, and wherein the cores of the rotor include at least one or more of the first cores.

9. The rotor according to claim 1, wherein there are more second cores than first cores.

10. The rotor according to claim 1, wherein the number of the fixation jaws that are provided in the first core is greater than the number of the fixation jaws that are provided in the second core.

11. The rotor according to claim 1, wherein an empty space that is defined after one of the permanent magnets is inserted into one of the slots is a barrier, and wherein the barrier is filled with epoxy resin.

12. The rotor according to claim 1, wherein the first core is disposed on the respective uppermost portions and lowermost portions of the cores of the rotor.

13. The rotor according to claim 1, wherein the first core and the second core are alternately stacked.

* * * * *